US012172665B2

(12) United States Patent
Nagasawa

(10) Patent No.: US 12,172,665 B2
(45) Date of Patent: Dec. 24, 2024

(54) DRIVING ASSISTANCE APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 88 days.

(21) Appl. No.: 18/297,234

(22) Filed: Apr. 7, 2023

(65) Prior Publication Data
US 2023/0339495 A1 Oct. 26, 2023

(30) Foreign Application Priority Data
Apr. 22, 2022 (JP) .................... 2022-070922

(51) Int. Cl.
*B60W 50/16* (2020.01)
*B60W 40/02* (2006.01)
(Continued)

(52) U.S. Cl.
CPC ............ *B60W 50/16* (2013.01); *B60W 40/02* (2013.01); *B60W 40/09* (2013.01);
(Continued)

(58) Field of Classification Search
CPC ...... B60W 50/16; B60W 40/02; B60W 40/09; B60W 60/0015; B60W 2050/143;
(Continued)

(56) References Cited

U.S. PATENT DOCUMENTS

2014/0088858 A1\* 3/2014 Stefan .................. G07C 5/0841
701/123
2015/0294547 A1\* 10/2015 Ito .......................... B60K 28/06
340/576
(Continued)

FOREIGN PATENT DOCUMENTS

JP          11-328593 A       11/1999
JP        2003-048449 A        2/2003
(Continued)

*Primary Examiner* — Omeed Alizada
(74) *Attorney, Agent, or Firm* — Rimon P.C.

(57) ABSTRACT

A driving assistance apparatus to be applied to a vehicle includes a traveling state detector, an emotion determination processor, and a driving assistance processor. The traveling state detector is configured to detect a traveling state of the vehicle. The emotion determination processor is configured to determine an emotion of an occupant of the vehicle. The driving assistance processor is configured to perform driving assistance control including one or both of information presentation to the occupant and traveling assistance control on the vehicle, in accordance with an output of one or both of the traveling state detector and the emotion determination processor. The emotion determination processor is configured to determine a driving unsuitable emotion by comparing, with a predetermined threshold, a difference between a reference value and a current value of a parameter indicating a physical state of the occupant, and to update the reference value at each driving cycle.

7 Claims, 6 Drawing Sheets

(51) Int. Cl.
*B60W 40/09* (2012.01)
*B60W 50/14* (2020.01)
*B60W 60/00* (2020.01)

(52) U.S. Cl.
CPC ... *B60W 60/0015* (2020.02); *B60W 2050/143* (2013.01); *B60W 2050/146* (2013.01); *B60W 2540/22* (2013.01); *B60W 2540/221* (2020.02); *B60W 2540/229* (2020.02)

(58) Field of Classification Search
CPC ....... B60W 2050/146; B60W 2540/22; B60W 2540/221; B60W 2540/229; B60W 40/08
See application file for complete search history.

(56) References Cited

U.S. PATENT DOCUMENTS

2018/0281811 A1\* 10/2018 Tochioka .............. B60W 50/12
2020/0039525 A1\* 2/2020 Hu .................... B60W 50/0098

FOREIGN PATENT DOCUMENTS

| JP | 2015-033457 A | 2/2015 |
| JP | 2018-169704 A | 11/2018 |
| JP | 2018-195249 A | 12/2018 |
| WO | 2013/171970 A1 | 11/2013 |

\* cited by examiner

DRIVING ASSISTANCE APPARATUS

CROSS-REFERENCE TO RELATED APPLICATIONS

The present application claims priority from Japanese Patent Application No. 2022-070922 filed on Apr. 22, 2022, the entire contents of which are hereby incorporated by reference.

BACKGROUND

The disclosure relates to a driving assistance apparatus to be applied to a vehicle such as an automobile.

For vehicles such as automobiles, various driving assistance apparatuses have been proposed that present information useful for operation of the vehicle to an occupant such as a driver, and automate some of driving operations to reduce a burden on the driver.

Such a driving assistance apparatus proposed detects a state of the occupant and reflects the state in driving assistance operations.

For example, Japanese Unexamined Patent Application Publication (JP-A) No. 2018-195249 discloses a safety driving assistance apparatus that acquires physical information on a pulse, a blood pressure, a brain wave, and visual field responsiveness of a driver, outputs a message to notify the driver when the physical information exhibits an abnormal value, and causes a vehicle to stop or switch to automatic driving to travel to, for example, a hospital when a poor physical condition state in which the driver is unable to continue driving is determined.

JP-A No. H11-328593 discloses monitoring physical information on a driver, and determining whether a health state of the driver is normal based on the monitored physical information and a predetermined determination criterion. JP-A No. H11-328593 also discloses determining a second determination criterion based on accumulated past physical information at a time when a predetermined amount of monitored past physical information is accumulated, and thereafter determining the health state of the driver based on the second determination criterion and the monitored physical information.

JP-A No. 2018-169704 discloses a driving assistance apparatus that learns an individual driver model unique to a driver based on driving data on the driver, analyzes a current emotional state of the driver based on voice data on the driver included in the driving data, and determines a recommended vehicle control process depending on the analyzed emotional state, based on the individual driver model. JP-A No. 2018-169704 also discloses referring to a general driver model provided from big data in analyzing the emotional state.

JP-A No. 2015-033457 discloses a driving state estimation apparatus including a steering-mounted electrocardiograph, a steering-mounted perspiration meter, a seat-mounted electrocardiograph, a driver physiological state estimation unit, a driving load estimation unit, and a driving state estimation unit. It is also disclosed that the driving state estimation unit compares a work load and a mental burden, and detects a normal state, a careless state, a carelessness resolved state, an excessive-wakefulness state, a suppressed state, a wakefulness decreased (low-wakefulness) state, and a wakefulness maintenance state against sleepiness.

JP-A No. 2003-048449 discloses a mental state determination apparatus including a mental determination processing unit that processes input signals and determines a mental state of a driver. It is also disclosed that the input signals are obtained from a vehicle speed sensor, a driver's seat door switch, an ignition key, a turn signal switch, a seatbelt switch, an illumination light sensor, a wiper switch, and a driver identification device.

International Publication No. WO 2013/171970 discloses a vehicle traveling assistance apparatus that detects an emotion of a driver based on a voice uttered by the driver and a state of an operation by the driver, and corrects assistance control operations in accordance with the detected emotion of the driver.

SUMMARY

An aspect of the disclosure provides a driving assistance apparatus to be applied to a vehicle. The driving assistance apparatus includes a traveling state detector, an emotion determination processor, and a driving assistance processor. The traveling state detector is configured to detect a traveling state of the vehicle. The emotion determination processor is configured to determine an emotion of an occupant of the vehicle. The driving assistance processor is configured to perform driving assistance control including one or both of information presentation to the occupant and traveling assistance control on the vehicle, in accordance with one or both of an output of the traveling state detector regarding the traveling state and an output of the emotion determination processor regarding the emotion of the occupant. The emotion determination processor is configured to determine, as the emotion of the occupant, a driving unsuitable emotion by comparing, with a predetermined threshold, a difference between a reference value and a current value of a parameter indicating a physical state of the occupant, and to update the reference value at each driving cycle.

An aspect of the disclosure provides a driving assistance apparatus to be applied to a vehicle. The driving assistance apparatus includes circuitry. The circuitry is configured to detect a traveling state of the vehicle. The circuitry is configured to determine an emotion of an occupant of the vehicle. The driving assistance processor is configured to perform driving assistance control including one or both of information presentation to the occupant and traveling assistance control on the vehicle, in accordance with one or both of the traveling state and the emotion of the occupant. The circuitry is configured to determine, as the emotion of the occupant, a driving unsuitable emotion by comparing, with a predetermined threshold, a difference between a reference value and a current value of a parameter indicating a physical state of the occupant, and to update the reference value at each driving cycle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
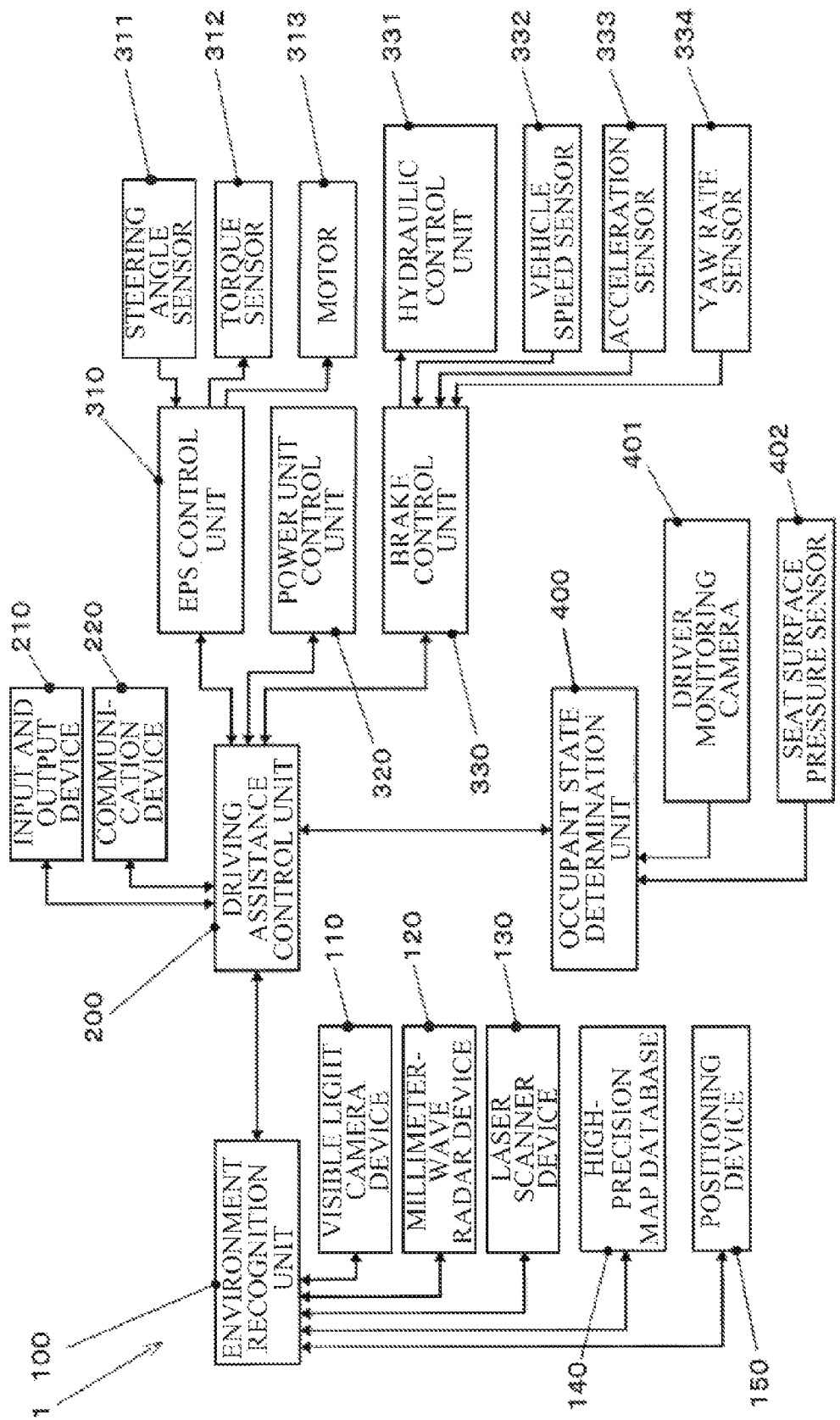
FIG. 1 is a diagram schematically illustrating a system configuration of a vehicle including a driving assistance apparatus according to one example embodiment of the disclosure.

When an emotional state of an occupant such as a driver is to be reflected in vehicle driving assistance, a correlation between the emotional state and a parameter to be used for determination of the emotional state greatly differs among individuals. Even for the same occupant, the same parameter does not always mean the same emotional state.

Therefore, when a state to be determined is set using past data on the occupant or data on a general driver, it can be difficult to appropriately determine a mental state of the occupant.

It is desirable to provide a driving assistance control apparatus that makes it possible to perform driving assistance control appropriately reflecting an emotional state of an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the following, a description is given of a driving assistance apparatus according to an example embodiment of the disclosure.

The driving assistance apparatus according to the example embodiment may be mounted on a vehicle, for example, a four-wheeled automobile such as a passenger car.

FIG. 1 is a diagram schematically illustrating a system configuration of a vehicle 1 including the driving assistance apparatus according to the example embodiment. The vehicle 1 may also be referred to as an own vehicle.

The vehicle 1 may include, for example, an environment recognition unit 100, a driving assistance control unit 200, an electric power steering (EPS) control unit 310, a power unit control unit 320, a brake control unit 330, and an occupant state determination unit 400.

The environment recognition unit 100, the driving assistance control unit 200, the electric power steering control unit 310, the power unit control unit 320, the brake control unit 330, and the occupant state determination unit 400 may each include a microcomputer. The microcomputer may include, for example, a data processor, a storage, an input/output interface, and a bus. The data processor may be a central processing unit (CPU), for example. The storage may be a random-access memory (RAM) and a read-only memory (ROM), for example. The bus may couple the data processor, the storage, and the input/output interface to each other.

In addition, for example, the environment recognition unit 100, the driving assistance control unit 200, the electric power steering control unit 310, the power unit control unit 320, the brake control unit 330, and the occupant state determination unit 400 may be coupled to each other via an in-vehicle local area network (LAN) or may be coupled directly to each other, thus being communicable with each other. The in-vehicle LAN may be a controller area network (CAN) communication system, for example.

The environment recognition unit 100 may recognize an environment around the own vehicle based on outputs of, for example, various sensors.

The environment around the own vehicle to be recognized may include, for example, a lane shape of a road on which the vehicle 1 travels, relative positions and relative speeds of various obstacles with respect to the own vehicle, directions for a route to be traveled by the vehicle 1, and information related to an accident, traffic congestion, and regulation.

The environment recognition unit 100 may be coupled to, for example, a visible light camera device 110, a millimeter-wave radar device 120, a laser scanner device 130, a high-precision map database 140, and a positioning device 150.

The visible light camera device 110 may be an imaging device that captures an image of surroundings (e.g., the front, the rear, or a right or left side) of the own vehicle, with a visible light camera such as a stereo camera or a monocular camera.

The visible light camera device 110 may be configured to perform image processing on the captured image to detect, for example, presence or absence of an object around the own vehicle, a relative position and a relative speed of the object with respect to the own vehicle, and the lane shape.

The millimeter-wave radar device 120 may be a radar device that uses radio waves in a frequency band of, for example, 30 to 300 GHz. The millimeter-wave radar device 120 may be configured to detect presence or absence of an object and a relative position of the object with respect to the own vehicle.

The laser scanner device 130 may be configured to irradiate surroundings of the vehicle with, for example, pulsed near-infrared laser light to scan the surroundings. The laser scanner device 130 may thereby detect, for example, presence or absence of an object, a relative position of the object with respect to the vehicle, and a shape of the object, based on presence or absence of reflected light and a time difference between irradiation with the laser light and returning of reflected light.

The high-precision map database 140 may accumulate data related to high-precision three-dimensional map data (a HD map) within a range assumed to be traveled by the vehicle 1.

This data may be three-dimensional data including information on a latitude, a longitude, and an altitude of a lane, a road shoulder edge, a lane division line or a lane line, etc. The three-dimensional data may have a resolution on the order of centimeters, for example.

The positioning device 150 may include, for example, a receiver of a quasi-zenith satellite system such as a global positioning system (GPS), a road-to-vehicle communication device, or a gyro sensor for autonomous navigation. The positioning device 150 may detect a current position of the vehicle 1.

The high-precision map database 140 and the positioning device 150 may cooperate with the environment recognition unit 100 and the driving assistance control unit 200 to serve as a navigation system that performs route guidance for a predetermined destination and information presentation involved in the route guidance. The information presentation may be, for example, presentation of information on a lane change or a right or left turn.

Such operations of the navigation system may also be included in driving assistance control, e.g., information presentation control, in the example embodiment.

The driving assistance control unit 200 may perform driving assistance control, based on the environment around the own vehicle recognized by the environment recognition unit 100, and a traveling state of the vehicle 1 and an emotional state of an occupant P recognized based on outputs of the units and sensors to be described later. In one embodiment, the driving assistance control unit 200 may serve as a "driving assistance processor".

Examples of the driving assistance control may include information presentation control of presenting information to the occupant P by means of, for example, an image, sound, or vibration, and traveling assistance control on the vehicle, such as controlling braking force, controlling an output of a traveling power source, or steering control.

The driving assistance control unit 200 may be coupled to an input and output device 210 and a communication device 220.

The input and output device 210 may include, for example, an image display device serving also as an input device such as a touch panel display, an output device such as an audio speaker or a vibration generator, and an input device such as a physical switch or an audio microphone. The vibration generator may be provided at a part that comes into contact with the occupant, such as a seat.

The input and output device 210 may be used by the occupant P to allow the occupant P to perform various settings related to driving assistance control.

The communication device 220 may communicate with a base station provided outside the vehicle, for example, via a wireless communication line, to transmit and receive various pieces of data.

The electric power steering control unit 310 may perform control of supplying an unillustrated steering device with assist force corresponding to a steering operation performed by the occupant P or steering force for automatic steering. The steering device may perform steering of wheels of the vehicle 1 to be steered, typically front wheels of the vehicle 1.

The electric power steering control unit 310 may be coupled to, for example, a steering angle sensor 311, a torque sensor 312, and a motor 313.

The steering angle sensor 311 may detect a steering angle of the steering device. In one embodiment, the steering angle sensor 311 may serve as a "steering angle detector".

The torque sensor 312 may detect torque applied to a steering shaft coupled to an unillustrated steering wheel. The steering wheel may receive a steering operation performed by the occupant P.

The electric power steering control unit 310 may generate the assist force in accordance with the torque detected by the torque sensor 312.

The motor 313 may be an electric actuator that applies the assist force and the steering force to the steering device and generates rack thrust.

The output of the motor 313 may be controlled by the electric power steering control unit 310.

The power unit control unit 320 may comprehensively control the traveling power source of the vehicle 1 and accessories thereof.

Used as the traveling power source may be, for example, an internal combustion engine (ICE), an electric motor, or an engine-electric motor hybrid system.

The power unit control unit 320 may set requested torque based on, for example, an amount of an operation on an unillustrated accelerator pedal, and control the traveling power source to make the actual torque generated by the traveling power source match the requested torque.

The brake control unit 330 may individually control the braking force of a brake device provided at each of a front-right wheel, a front-left wheel, a rear-right wheel, and a rear-left wheel of the vehicle. In other words, the brake control unit 330 may control the braking force of the brake device for each wheel.

The brake device may include, for example, a hydraulic disc brake.

The brake control unit 330 may be coupled to, for example, a hydraulic control unit 331, a vehicle speed sensor 332, an acceleration sensor 333, and a yaw rate sensor 334.

The hydraulic control unit 331 may be a hydraulic pressure control device that individually adjusts a brake fluid pressure of an unillustrated wheel cylinder of each of the wheels.

The hydraulic control unit 331 may include an electric pump that applies pressure to the brake fluid. The hydraulic control unit 331 may also include valves that control the brake fluid pressure of the wheel cylinder of each of the wheels. Such valves may include, for example, a pressure-increasing valve, a pressure-reducing valve, and a pressure holding valve.

The hydraulic control unit 331 may be coupled to, for example, an unillustrated master cylinder and the wheel cylinder, via a brake fluid pipe.

The master cylinder may apply pressure to the brake fluid, in accordance with an operation on an unillustrated brake pedal. The brake pedal may receive a brake operation performed by a driver who drives the vehicle.

The brake fluid pressure generated by the master cylinder may be transmitted to the wheel cylinder via the hydraulic control unit 331.

The hydraulic control unit 331 may perform an override on the brake fluid pressure generated by the master cylinder, to increase and decrease the brake fluid pressure of the wheel cylinder of each of the wheels.

The wheel cylinder may be provided for each of the wheels. The wheel cylinder may generate friction force or braking force corresponding to the brake fluid pressure by pressing a brake pad against a disc rotor, for example.

The vehicle speed sensor 332 may be provided at a hub that rotatably supports each of the wheels. The vehicle speed sensor 332 may generate a vehicle speed signal corresponding to a rotation speed of each of the wheels.

The acceleration sensor 333 may detect acceleration rates in a longitudinal direction and a lateral direction, i.e., a vehicle width direction, each applied to a vehicle body. In one embodiment, the acceleration sensor 333 may serve as an "acceleration or deceleration detector".

The yaw rate sensor 334 may detect a yaw rate, i.e., an angular speed of rotation or yawing around a vertical axis of the vehicle body.

The electric power steering control unit 310, the power unit control unit 320, and the brake control unit 330 described above may cooperate with the environment recognition unit 100 to serve as a "traveling state detector" that detects the traveling state of the vehicle 1 in one embodiment.

The occupant state determination unit 400 may determine, for example, a consciousness state, the emotional state, and a health state of the occupant P, typically the driver.

The occupant state determination unit 400 may be coupled to, for example, a driver monitoring camera 401 and a seat surface pressure sensor 402.

The driver monitoring camera 401 and the seat surface pressure sensor 402 may cooperate with the occupant state determination unit 400 to serve as an "occupant monitoring detector" in one embodiment.

Figure 2:
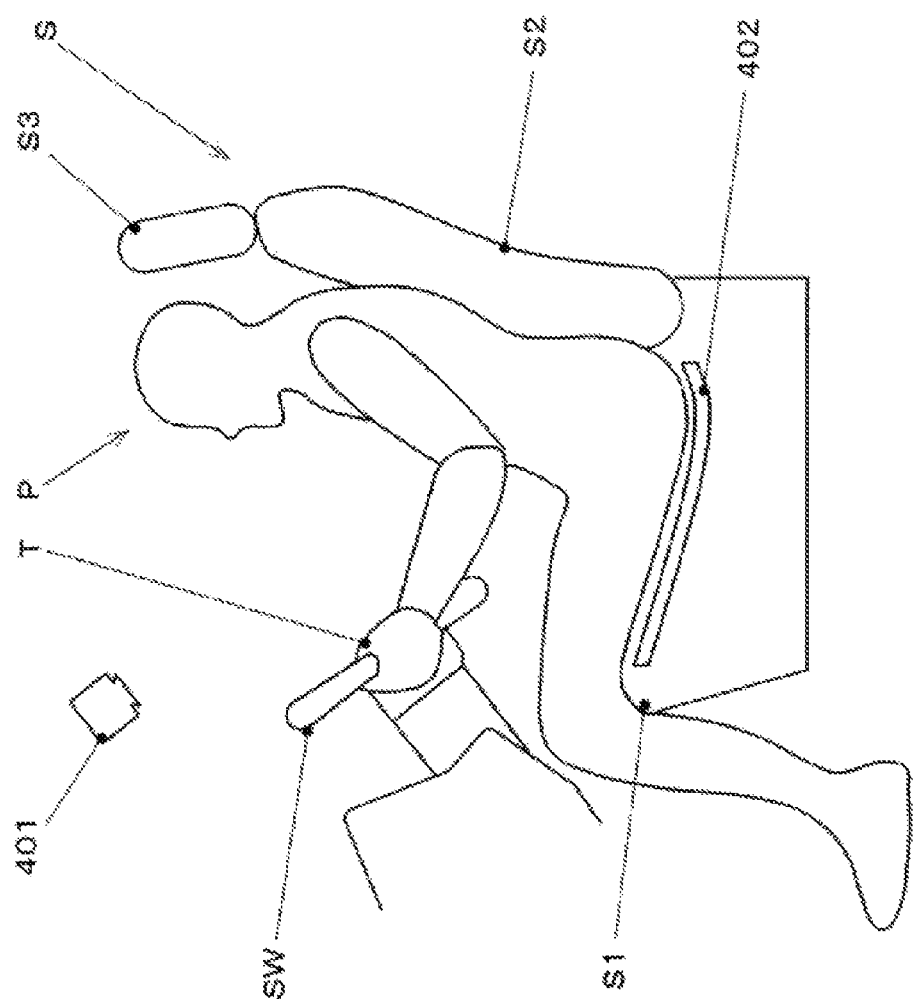
FIG. 2 is a diagram schematically illustrating an arrangement of a driver monitoring camera and a seat surface pressure sensor in the driving assistance apparatus according to one example embodiment.

FIG. 2 is a diagram schematically illustrating an arrangement of the driver monitoring camera 401 and the seat surface pressure sensor 402 in the driving assistance apparatus according to the example embodiment.

The vehicle 1 may include a seat S on which the occupant P is to be seated.

The seat S may include, for example, a seat cushion S1, a backrest S2, and a headrest S3.

The seat cushion S1 may be a seat surface portion on which a part such as a thigh or a hip of the occupant P is to be placed.

The backrest S2 may be a portion that comes into contact with a back of the occupant and holds an upper body of the occupant.

The backrest S2 may protrude upward and diagonally rearward from the vicinity of a rear part of the seat cushion S1.

The headrest S3 may be disposed to be positioned behind a head of the occupant.

The headrest S3 may hold the head when the head moves backward.

The headrest S3 may be disposed to protrude upward from an upper end of the backrest S2.

The driver monitoring camera 401 may be an imaging device that captures an image of the occupant P from the front side of the vehicle.

The driver monitoring camera 401 may be disposed to include, in an imaging angle of view, a face of the occupant P and a hand of the occupant P in a state of holding a steering wheel SW.

The driver monitoring camera 401 may include, for example, a solid-state image sensor such as a complementary metal oxide semiconductor (CMOS) or a charge-coupled device (CCD), an optical system such as a lens group that forms a subject image on the solid-state image sensor, and a drive circuit and an output processing circuit for the solid-state image sensor.

The seat surface pressure sensor 402 may be provided at the seat cushion S1. The seat surface pressure sensor 402 may measure distribution of a surface pressure that an upper surface of the seat cushion S1 receives from the occupant P.

The occupant state determination unit 400 may be provided with a sensor other than these sensors.

For example, a sensor may be provided that acquires various pieces of biometric information, i.e., vital signs, including a heart rate, a body temperature, a blood pressure, and a blood oxygen saturation level of the occupant.

The occupant state determination unit 400 may determine an emotion of the occupant P based on, for example, information related to the environment around the own vehicle recognized by the environment recognition unit 100, the traveling state of the vehicle 1 such as information detected by the various sensors, and an occupant state detected by a device such as the driver monitoring camera 401 or the seat surface pressure sensor 402. In one embodiment, the occupant state determination unit 400 may serve as an "emotion determination processor". This point is described in detail below.

The occupant state determination unit 400 may determine an attention distracted state, an anxious and confused state, and an impatient and angry state, as examples of a driving unsuitable emotion unsuitable for driving.

Figure 3:
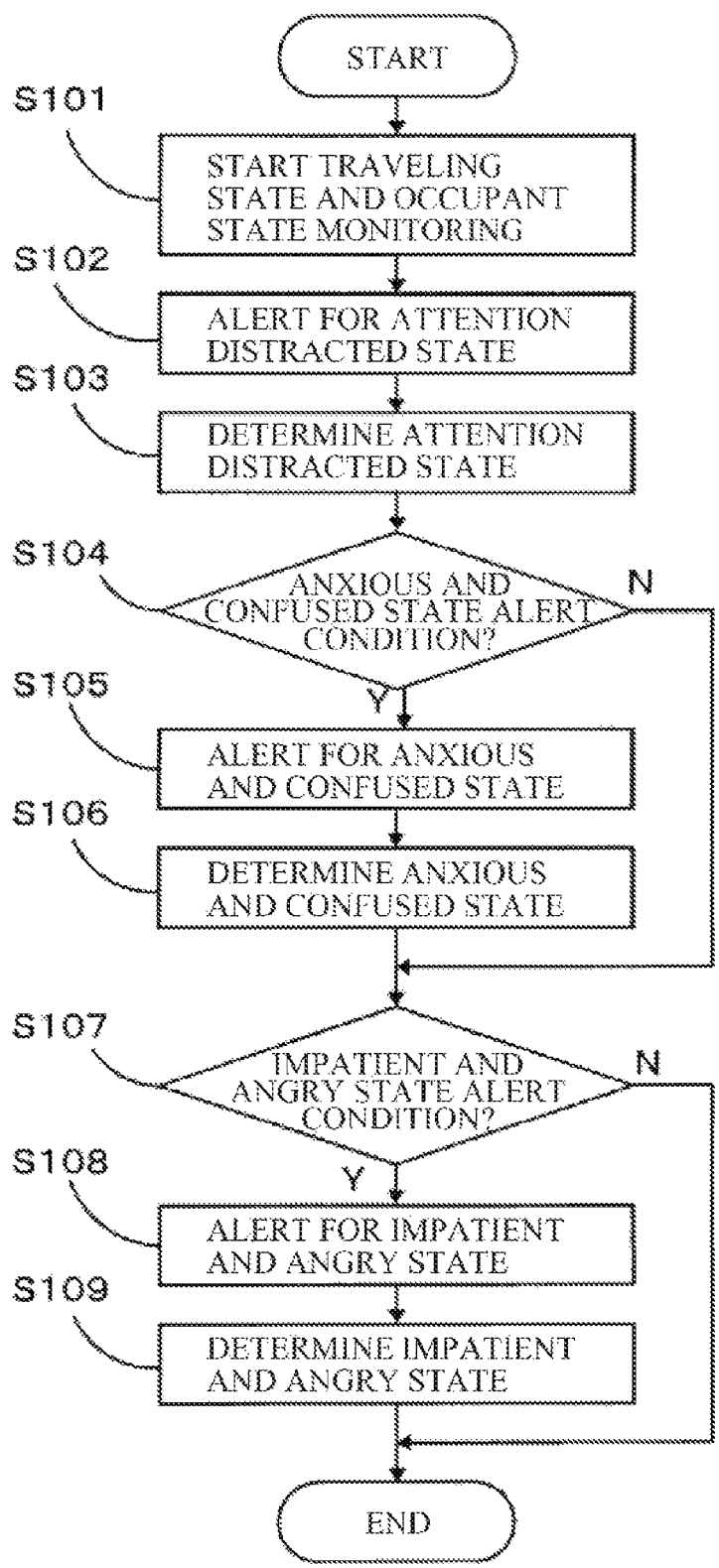
FIG. 3 is a flowchart illustrating a basic configuration of emotion determination regarding an occupant in the driving assistance apparatus according to one example embodiment.

FIG. 3 is a flowchart illustrating a basic configuration of emotion determination regarding the occupant in the driving assistance apparatus according to the example embodiment.

In the following, description is given in the order of steps.
[Step S101: Start of Traveling State and Occupant State Monitoring]

The occupant state determination unit 400 may start monitoring of the traveling state and the occupant state described above, after a predetermined initialization process.

The initialization process may be a process of initializing various parameters to be used for emotion determination regarding the occupant. The initialization process may normally be performed upon start of a driving cycle of the vehicle 1. The driving cycle may be a series of periods including, in order, turning on of a main power of the vehicle 1, start of traveling, arrival at a destination, and turning off of the main power.

For example, the occupant state determination unit 400 may determine the start of the driving cycle, in response to that the main power of the vehicle 1 is turned on or an ignition is turned on, the occupant P wears a seatbelt, and the vehicle enters a state of being able to travel (e.g., shift of a transmission to a traveling range).

For example, the occupant state determination unit 400 may set an initialization value of the parameter to be used for emotion determination based on, for example, an average value in a predetermined period (e.g., five minutes) during low-speed traveling at a vehicle speed of 10 km/h or less or at a stop. Examples of the parameter may include the distribution of the seat surface pressure detected by the seat surface pressure sensor 402, and a gap "g" between the steering wheel SW and a finger of the occupant (see FIGS. 4A and 4B) obtained by image processing from the image captured by the driver monitoring camera 401.

Other examples of the parameter to be used for emotion determination may include an amount of movement of a line of sight and an amount of movement of a direction of the face or the head in normal traveling. Also for these parameters, the initialization process, i.e., acquisition of the initialization value, may be performed similarly.

The initialization value set here may serve as a reference value of the parameter indicating a physical state of the occupant. The emotion determination described below is performed basically by comparing, with a predetermined threshold, a difference between the initialization value or the reference value and a current value of each parameter.

When a predetermined amount of data is not collectable within a predetermined period, or when the parameter is not measurable while the vehicle is present on a horizontal surface, the occupant state determination unit 400 may perform correction or re-acquisition of the initialization value for improvement in accuracy when a predetermined condition is satisfied.

Examples of the predetermined condition may include a case where a traffic light ahead of the own vehicle indicates a stop, i.e., a red light, a case where the vehicle speed is 0 km/h, a case where the steering angle detected by the steering angle sensor 311 is substantially zero, and a case where the acceleration rates in the longitudinal direction and the lateral direction detected by the acceleration sensor 333 are zero, which indicates that the vehicle is stopped on a horizontal surface. The vehicle speed of 0 km/h may include a micro-speed at which the vehicle speed is undetectable.

Note that such initialization of the parameter may be performed multiple times during a single driving cycle.

After the start of the monitoring of the traveling state and the occupant state, the flow may proceed to step S102.

[Step S102: Alert for Attention Distracted State]

The occupant state determination unit 400 may go on an alert for the attention distracted state, i.e., focusing on monitoring the parameter to be used for determination of the attention distracted state of the occupant P. Focusing on monitoring the parameter may include increasing an amount of data by, for example, improving a temporal resolution of data acquisition as compared with in a normal situation, i.e., when not on the alert.

The attention distracted state may be determined based on, for example, fixing of a visual field of the occupant P, or fluctuation or deviation of an inter-vehicle distance between the own vehicle and a preceding vehicle present ahead.

Fixing of the visual field may be determined based on, for example, a line-of-sight direction of the driver detected from information such as the image captured by the driver monitoring camera 401.

For example, it may be determined that the occupant P is in the attention distracted state, when a state in which the line-of-sight direction does not change by a predetermined amount or more continues for a predetermined time or more. The state in which the line-of-sight direction does not change by a predetermined amount or more may typically be a state in which an amount of displacement of the line-of-sight direction is equal to or less than a threshold set small.

Fluctuation of the inter-vehicle distance between the own vehicle and the preceding vehicle may be determined based on, for example, transition of a relative distance of the preceding vehicle with respect to the own vehicle detected by the environment recognition unit 100.

For example, when the inter-vehicle distance fluctuates by a predetermined value or more within a predetermined period, it may be determined that the occupant P is in the attention distracted state.

Thereafter, the flow may proceed to step S103.

[Step S103: Determination of Attention Distracted State]

The occupant state determination unit 400 may detect whether the attention distracted state of the occupant P has been determined, within a predetermined attention distracted state alert period (e.g., within 10 minutes) set in advance, by at least one of the determination methods described above.

After it is determined whether the occupant P is in the attention distracted state, the flow may proceed to step S104.

[Step S104: Determination of Anxious and Confused State Alert Condition]

The occupant state determination unit 400 may determine whether, while on the alert for the attention distracted state, a predetermined condition under which it is to be determined whether the occupant P is in the anxious and confused state is satisfied.

As examples of the condition under which the anxious and confused state is to be determined, determination may be made based on a frequency of a vertical motion or swing of the head, i.e., the direction of the face, of the occupant P, or fluctuation of the line-of-sight direction. The condition may be an event upon which it is estimated that the occupant P is likely to be in the anxious and confused state.

When the frequency of the vertical motion of the head is high, the occupant P seems to be frequently viewing, for example, a screen of a navigation device or mirrors, and it may be estimated that the occupant P does not have a sufficient grasp of a surrounding situation or has a sense of anxiety about the surrounding situation.

For example, it may be assumed that the anxious and confused state is to be determined, when swing of the head occurs a predetermined number of times (e.g., three times) or more within a predetermined time (e.g., three seconds). The swing of the head may be, for example, reversal of a movement direction of the head.

Similarly, also when the line-of-sight direction fluctuates greatly, it may be estimated that the occupant does not have a sufficient grasp of the surrounding situation or has a sense of anxiety about the surrounding situation.

For example, it may be assumed that the anxious and confused state is to be determined, when deviation of a central visual field, i.e., a range scanned by the central visual field, has spread to three times or more as compared with that at the latest stop at a red light.

In another example, the condition under which the anxious and confused state is to be determined may be determined based on the traveling state.

For example, it may be assumed that the anxious and confused state is to be determined, also in cases such as when the driving assistance control unit 200 determines zigzag traveling or when the inter-vehicle distance between the own vehicle and the preceding vehicle fluctuates by a predetermined value or more within a predetermined period, based on transition of an in-lane lateral position of the own vehicle recognized by the environment recognition unit 100.

If determination is made that the anxious and confused state is to be determined (step S104: Y), the flow may proceed to step S105, and otherwise (step S104: N), the flow may proceed to step S107.

[Step S105: Alert for Anxious and Confused State]

The occupant state determination unit 400 may go on an alert for the anxious and confused state, i.e., focusing on monitoring the parameter to be used for determination of the anxious and confused state of the occupant P.

The anxious and confused state may be determined based on, for example, the distribution of the seat surface pressure on the seat cushion S1 detected by the seat surface pressure sensor 402, or a gap between a rim of the steering wheel SW and a finger of the occupant P detected based on the image captured by the driver monitoring camera 401. The distribution of the seat surface pressure may serve as the parameter indicating a seating posture of the occupant P.

Regarding the seat surface pressure, for example, it may be determined that the occupant P is in the anxious and confused state, when the distribution of the seat surface pressure fluctuates by a predetermined amount or more, i.e., the seating posture changes, at a predetermined frequency or more (e.g., three times or more in 10 minutes).

Also when a center of gravity of the occupant moves rearward by a predetermined amount or more (e.g., 2% or more with respect to the latest initialization value), it may be determined that the occupant P is in a nervous state, which is a kind of the anxious and confused state.

Figure 4A:
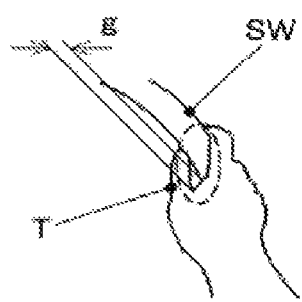
FIGS. 4A and 4B are diagrams each illustrating an example of a state of fingers of the occupant that hold a steering wheel.
Figure 4B:
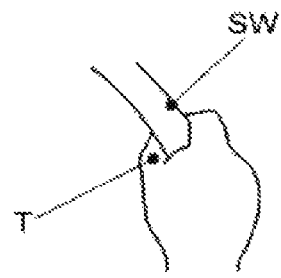

FIGS. 4A and 4B are diagrams each illustrating an example of a state of fingers of the occupant that hold the steering wheel.

FIG. 4A illustrates a case where the occupant is not in the nervous state.

In general, when not in the nervous state but in a relaxed state, the occupant P tends not to strongly grip the rim of the steering wheel SW.

In such a case, the gap "g" may be observed often between the steering wheel SW and a thumb T.

Note that, although the thumb T may be used in this example, a gap between another finger and the steering wheel SW may be used as the parameter.

FIG. 4B illustrates a case where the occupant is in the nervous state.

In general, when the occupant P is in the nervous state (including the anxious and confused state and the impatient and angry state), the occupant P tends to strongly grip the rim of the steering wheel SW. The gap "g" may thus become smaller or disappear, as compared with when the occupant P is not in the nervous state.

When the gap "g" becomes so small that the difference between the current value and the initialization value of the gap "g" detected based on the image captured by the driver monitoring camera 401 exceeds a preset threshold, the occupant state determination unit 400 may determine that the occupant P strongly grips the steering wheel SW and is in the anxious and confused state.

Thereafter, the flow may proceed to step S106.

[Step S106: Determination of Anxious and Confused State]

The occupant state determination unit 400 may determine whether the anxious and confused state of the occupant P has been determined, within a predetermined anxious and confused state alert period (e.g., within 10 minutes) set in advance, by at least one of the determination methods described above.

After it is determined whether the occupant P is in anxious and confused state, the flow may proceed to step S107.

[Step S107: Determination of Impatient and Angry State Alert Condition]

The occupant state determination unit 400 may determine whether, while on the alert for the anxious and confused state, a predetermined condition under which it is to be determined whether the occupant P is in the impatient and angry state is satisfied.

For example, when the above-described gap "g" between the steering wheel SW and the thumb T becomes equal to or less than a predetermined value (step S107: Y), the occupant state determination unit 400 may assume that the impatient and angry state is to be determined, and cause the flow to proceed to step S108. Otherwise (step S107: N), the occupant state determination unit 400 may end the series of processes.

[Step S108: Alert for Impatient and Angry State]

The occupant state determination unit 400 may go on an alert for the impatient and angry state, i.e., focusing on monitoring the parameter to be used for determination of the impatient and angry state of the occupant P.

The impatient and angry state may be determined based on, for example, that a sudden acceleration or deceleration operation by a predetermined amount or more and a steering operation are performed concurrently on the vehicle 1, which is a typical example of harsh driving.

The occupant state determination unit 400 may determine that the occupant P is in the impatient and angry state, for example, when the steering angle sensor 311 detects a change in the steering angle by a predetermined threshold or more and, concurrently, the acceleration sensor 333 detects a change in the longitudinal acceleration rate by a predetermined threshold or more, i.e., sudden acceleration or sudden deceleration.

Thereafter, the flow may proceed to step S109.

[Step S109: Determination of Impatient and Angry State]

The occupant state determination unit 400 may determine whether the impatient and angry state of the occupant P has been determined, within a predetermined impatient and angry state alert period (e.g., within 10 minutes) set in advance, by the determination method described above.

After it is determined whether the occupant P is in the impatient and angry state, the series of processes may be ended.

Note that, in the emotion determination in the example embodiment, multiple emotional states out of the attention distracted state, the anxious and confused state, and the impatient and angry state may be determined concurrently in some cases.

In general, it is considered that human concentration continues for, for example, about 15 minutes.

In driving of a vehicle, which necessitates operations using a complex capability, for example, traveling for 10 minutes corresponding to about 5-km movement on a general road often causes some sort of change in the emotional state.

For example, under high stress, the attention can be distracted to result in driving with frequent oversights, or a failure in driving can result in occurrence of an unexpected event such as an accident.

To address this, the occupant state determination unit 400 may manage a sensing system in units of predetermined alert periods (e.g., 10 minutes).

In one example, while being on the alert for the attention distracted state for a predetermined alert period (e.g., 10 minutes), when the occupant P is suspected of being in the anxious and confused state, the occupant state determination unit 400 may go on the alert for the anxious and confused state for a new alert period (e.g., 10 minutes). Thereafter, when the occupant P is suspected of being in the impatient and angry state, the occupant state determination unit 400 may go on the alert for the impatient and angry state for a new alert period (e.g., 10 minutes).

Thus, even if the emotion of the occupant P sequentially transitions in a direction further unsuitable for a driving operation, it is possible to appropriately determine or estimate the emotional state.

Aside from the emotion determination described above, when a frequency of a brake operation by the driver detected by the brake control unit 330 is equal to or less than a predetermined value and very low, or when a deceleration rate of the vehicle 1 detected by the acceleration sensor 333 is equal to or less than a predetermined value and substantially no deceleration operation is performed, the occupant state determination unit 400 may assume that a driving capability of the occupant P has significantly decreased, and cause the driving assistance control unit 200 to execute forced stop control of stopping the vehicle 1 at a safe location such as a road shoulder by automatic driving.

Furthermore, when any of the following events is detected, the occupant state determination unit 400 may assume that the occupant P is suspected of being in a driving incapable state due to an abnormal physical condition of the occupant P, and cause the driving assistance control unit 200 to execute the forced stop control described above, and also use the communication device 220 to notify a server of, for example, a predetermined institution such as the police, an ambulance, or a medical institution. The driving incapable state may indicate, for example, deterioration of the physical condition to an extent that a consciousness level decreases, or an intoxicated state resulting from drinking, drug, etc.

(a) Fixing of the visual field of the occupant P (e.g., three seconds or more)
  (b) When it is determined that eyes of the occupant P are closed, i.e., the occupant P is recognized as being unconscious, based on the image captured by the driver monitoring camera 401
  (c) When the driving assistance control unit 200 determines predetermined zigzag traveling
  (d) When fluctuation of the inter-vehicle distance between the own vehicle and the preceding vehicle is equal to or greater than a predetermined poor-physical-condition determination threshold
  (e) When an amount of rearward or downward movement of the center of gravity of the occupant P detected by the seat surface pressure sensor 402 is equal to or greater than a predetermined poor-physical-condition determination threshold A description is given next of driving assistance control operations corresponding to a result of the above-described emotion determination or estimation regarding the occupant P.

Figure 5:
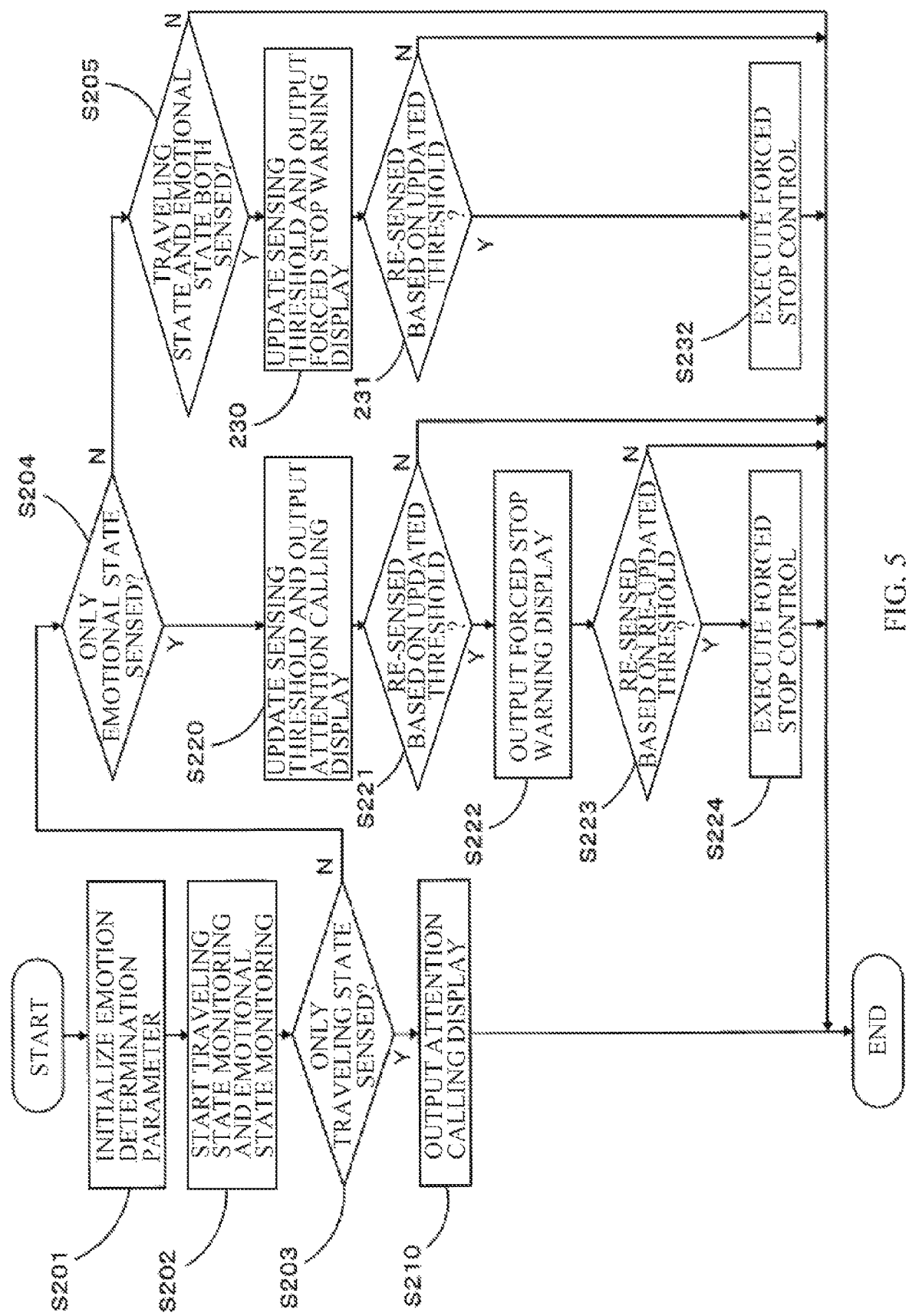
FIG. 5 is a flowchart illustrating basic control operations in the driving assistance apparatus according to one example embodiment.

FIG. 5 is a flowchart illustrating basic control operations in the driving assistance apparatus according to the example embodiment.

In the following, description is given in the order of steps.

[Step S201: Emotion Determination Parameter Initialization]

In response to start of the driving cycle of the vehicle 1 (e.g., turning on of the main power of the vehicle 1 or turning on of the ignition), the occupant state determination unit 400 may initialize each parameter to be used for emotion determination or estimation.

Thereafter, the flow may proceed to step S202.

[Step S202: Start of Traveling State and Emotional State Monitoring]

The driving assistance control unit 200 may start monitoring of the traveling state of the vehicle 1. Examples of the traveling state of the vehicle may include the vehicle speed and the longitudinal acceleration rate of the vehicle 1, the inter-vehicle distance between the own vehicle and the preceding vehicle, the in-lane lateral position of the vehicle 1, presence or absence of an obstacle, and relative position and speed of the obstacle, if present, with respect to the vehicle 1.

The occupant state determination unit 400 may start the above-described monitoring of the emotional state of the occupant P such as the driver.

Thereafter, the flow may proceed to step S203.

[Step S203: Determination of Traveling State Sensing]

The driving assistance control unit 200 may determine whether the driving assistance control unit 200 has sensed an event that requests driving assistance in relation to the traveling state, and the occupant state determination unit 400 has not sensed an event related to the emotional state, i.e., determination of one or more of the attention distracted state, the anxious and confused state, and the impatient and angry state.

Examples of the event that requests driving assistance in relation to the traveling state may include the following.

(a) Zigzag or erratic traveling of the vehicle 1, i.e., fluctuation of the in-lane lateral position by a predetermined amount or more
  (b) Lane departure of the vehicle 1
  (c) The inter-vehicle distance between the vehicle 1 and the preceding vehicle becoming as close as a predetermined value or less
  (d) Detection of an obstacle, i.e., a risk target, around the own vehicle Examples of the risk target may include another vehicle, a pedestrian, a bicycle, and other various objects that hinder passage of the vehicle 1.

Other examples of the risk target may include another vehicle present on the rear right or the rear left when the vehicle makes a lane change.

(e) The vehicle speed exceeding a speed limit
  (f) Various pieces of information related to, for example, traffic congestion, regulation, or an accident on the route planned to be traveled by the vehicle 1

If an event that requests driving assistance in relation to the traveling state occurs and an event related to the emotional state does not occur (step S203: Y), the flow may proceed to step S210, and otherwise (step S203: N), the flow may proceed to step S204.

[Step S204: Determination of Emotional State Sensing]

The driving assistance control unit 200 may determine whether the occupant state determination unit 400 has sensed an event related to the emotional state, i.e., one or more of the attention distracted state, the anxious and confused state, and the impatient and angry state, and the driving assistance control unit 200 has not sensed an event that requests driving assistance in relation to the traveling state.

If an event related to the emotional state has been sensed and an event that requests driving assistance in relation to the traveling state has not been sensed (step S204: Y), the flow may proceed to step S220, and otherwise (step S204: N), the flow may proceed to step S205.

[Step S205: Determination of Traveling State and Emotional State Sensing]

The driving assistance control unit 200 may determine whether the driving assistance control unit 200 has sensed an event that requests driving assistance in relation to the traveling state, and the occupant state determination unit 400 has sensed an event related to an emotional state unsuitable for driving, i.e., the attention distracted state, the anxious and confused state, or the impatient and angry state.

If events related to the traveling state and the emotional state have both been sensed (step S205: Y), the flow may proceed to step S230, and otherwise (step S205: N), the series of processes may be ended, or a return may be made.

[Step S210: Output of Attention-Calling Display]

The driving assistance control unit 200 may cause the input and output device 210 to output a display that calls attention to the occupant P, regarding the determined event out of the above-described events that request driving assistance in relation to the traveling state.

Thereafter, the series of processes may be ended.

[Step S220: Update of Sensing Threshold and Output of Attention-Calling Display]

The driving assistance control unit 200 may update a threshold for sensing of an event that requests driving assistance in relation to the traveling state, in a direction that allows for easier establishment of determination. In other words, the driving assistance control unit 200 may perform threshold reduction.

In addition, the driving assistance control unit 200 may cause the input and output device 210 to output a display that calls attention to the occupant P, regarding the determined event out of the above-described events related to the emotional state.

Thereafter, the flow may proceed to step S221.

[Step S221: Determination of Re-Sensing Based on Updated Threshold]

The driving assistance control unit 200 may determine, based on the threshold updated in step S220, whether an event that requests driving assistance in relation to the traveling state has been re-sensed.

If an event that requests driving assistance in relation to the traveling state has been re-sensed (step S221: Y), the flow may proceed to step S222, and otherwise (step S221: N), the series of processes may be ended.

[Step S222: Output of Forced Stop Warning Display]

The driving assistance control unit 200 may cause the input and output device 210 to output or present, to the occupant P, a warning indicating that the emotional state and the traveling state have deteriorated and the vehicle 1 is to be stopped.

Thereafter, the flow may proceed to step S223.

[Step S223: Determination of Re-Sensing Based on Re-Updated Threshold]

The driving assistance control unit 200 may determine whether an event that requests driving assistance in relation to the traveling state has been re-sensed, based on a threshold obtained by re-updating (i.e., reducing) the threshold updated in step S220 in a direction that allows for further easier establishment of determination.

If an event that requests driving assistance in relation to the traveling state has been re-sensed (step S223: Y), the flow may proceed to step S224, and otherwise (step S223: N), the series of processes may be ended.

[Step S224: Execution of Forced Stop Control]

The driving assistance control unit 200 may execute forced stop control of stopping the vehicle 1 at a safe location such as a road shoulder, by automatic driving in which the driving assistance control unit 200 controls steering and acceleration or deceleration.

Thereafter, the series of processes may be ended.

[Step S230: Update of Sensing Threshold and Output of Forced Stop Warning Display]

The driving assistance control unit 200 may update a threshold for sensing of an event that requests driving assistance in relation to the traveling state, in a direction that allows for easier establishment of determination. In other words, the driving assistance control unit 200 may perform threshold reduction.

In addition, the driving assistance control unit 200 may cause the input and output device 210 to output or present, to the occupant P, a warning indicating that the emotional state and the traveling state have deteriorated and the vehicle 1 is to be stopped.

Thereafter, the flow may proceed to step S231.

[Step S231: Determination of Re-Sensing Based on Updated Threshold]

The driving assistance control unit 200 may determine, based on the threshold updated in step S230, whether an event that requests intervention of driving assistance control in relation to the traveling state has been re-sensed.

If an event that requests intervention of driving assistance control in relation to the traveling state has been re-sensed (step S231: Y), the flow may proceed to step S232, and otherwise (step S231: N), the series of processes may be ended.

[Step S232: Execution of Forced Stop Control]

The driving assistance control unit 200 may execute forced stop control of stopping the vehicle 1 at a safe location such as a road shoulder by automatic driving.

Thereafter, the series of processes may be ended.

When the occupant P stops the vehicle 1 in response to the forced stop warning described above, the driving assistance control unit 200 may prohibit driving of the vehicle 1 until the emotional state of the occupant P is estimated to have recovered to an extent that the occupant P enters a state suitable for driving, and thereafter permit driving of the vehicle 1.

For example, when the vehicle speed is 0 km/h, and one or more of opening of a door or a side window, reclining of the seat S, and keeping of the transmission in a non-traveling range for a predetermined time (e.g., five minutes) or more are detected, the driving assistance control unit 200 may assume that the occupant P has taken a rest for a predetermined period or more and the emotional state of the occupant P has been recovered or refreshed, and permit driving of the vehicle 1.

Also when the driving assistance control unit 200 forcedly stops the vehicle 1, or performs automatic stop of the vehicle 1, the driving assistance control unit 200 may perform a similar process.

Furthermore, when the emotional state has deteriorated by a predetermined amount or more, the driving assistance control unit 200 may use the communication device 220 to notify a party concerned, such as a family member, a medical institution, or a specialized institution.

In the driving assistance apparatus according to the example embodiment, different driving assistance may be performed depending on the kind of the determined emotional state.

Figure 6:
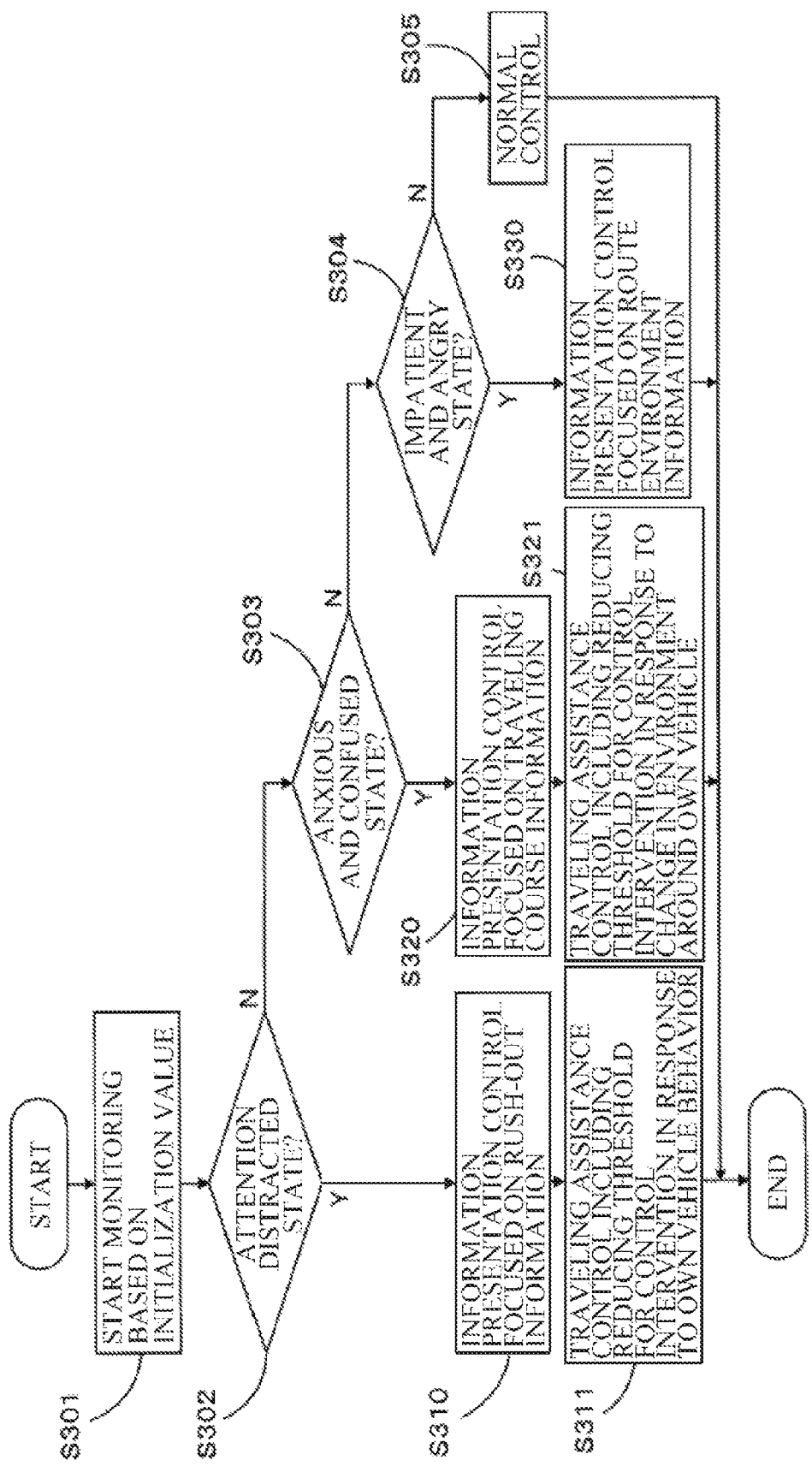
FIG. 6 is a diagram illustrating a change in driving assistance control operations corresponding to an emotional state of the occupant in the driving assistance apparatus according to one example embodiment.

FIG. 6 is a diagram illustrating a change in driving assistance control operations corresponding to the emotional state of the occupant in the driving assistance apparatus according to the example embodiment.

In the following, description is given in the order of steps.

[Step S301: Start of Monitoring Based on Initialization Value]

The occupant state determination unit 400 may initialize the parameters for emotion determination regarding the occupant P as described above, and thereafter start monitoring of each parameter.

Thereafter, the flow may proceed to step S302. [Step S302: Determination of Attention Distracted State]

The driving assistance control unit 200 may determine whether the occupant state determination unit 400 has determined the attention distracted state of the occupant P (step S103).

If the attention distracted state has been determined (step S302: Y), the flow may proceed to step S310, and otherwise (step S302: N), the flow may proceed to step S303.

[Step S303: Determination of Anxious and Confused State]

The driving assistance control unit 200 may determine whether the occupant state determination unit 400 has determined the anxious and confused state of the occupant P (step S106).

If the anxious and confused state has been determined (step S303: Y), the flow may proceed to step S320, and otherwise (step S303: N), the flow may proceed to step S304. [Step S304: Determination of Impatient and Angry State]

The driving assistance control unit 200 may determine whether the occupant state determination unit 400 has determined the impatient and angry state of the occupant P (step S109).

If the impatient and angry state has been determined (step S304: Y), the flow may proceed to step S330, and otherwise (step S304: N), the flow may proceed to step S305.

[Step S305: Normal Control]

The driving assistance control unit 200 may perform normal driving assistance control based on the assumption that the emotional state of the occupant P is normal, i.e., a state suitable for driving.

Thereafter, the series of processes may be ended.

[Step S310: Information Presentation Control Focused on Rush-Out Information]

The driving assistance control unit 200 may execute, by means of the input and output device 210, information presentation control of presenting various pieces of information to the occupant.

Examples of the information to be presented to the occupant may include the following.

(a) An alarm about the inter-vehicle distance between the own vehicle and the preceding vehicle, i.e., an alarm issued when the inter-vehicle distance is excessively small or when the inter-vehicle distance is fluctuating (b) A speed management alarm, i.e., an alarm issued in a case of an overspeed (c) Traveling course information, i.e., an alarm issued in a case of zigzag traveling or lane departure, and guidance that prompts the occupant to make a lane change (d) Rush-out information, i.e., an alarm issued when a risk target whose possibility of contact with the own vehicle is equal to or greater than a predetermined value appears ahead of the own vehicle (e) Route environment information, i.e., information related to, for example, a road surface situation including a curvature and a gradient of a road, a sun position, and a decrease in air temperature on the route planned to be traveled by the own vehicle The driving assistance control unit 200 may reduce an output frequency of the information regarding (a) to (c) and (e), as compared with in normal control, and focus on outputting the information regarding (d). In other words, the driving assistance control unit 200 may perform environment information presentation control focused on the rush-out information regarding an environment ahead of the own vehicle.

Thereafter, the flow may proceed to step S311.

[Step S311: Traveling Assistance Control Including Reducing Intervention Threshold Related to Own Vehicle Behavior]

The driving assistance control unit 200 may perform traveling assistance control of intervening in the control on the steering device, the traveling power source, and the brake device of the vehicle, in accordance with the environment around the own vehicle detected by the environment recognition unit 100 and the traveling state of the own vehicle detected by the sensors.

Examples of control operations included in the traveling assistance control may include the following.

(a) Autonomous emergency braking control, i.e., collision-damage-reducing braking control, performed when a risk target whose possibility of contact with the own vehicle is equal to or greater than a predetermined value appears ahead of the own vehicle (b) Lane departure prevention control of generating a yaw moment in a restoration direction when the vehicle departs from a lane or is likely to depart from a lane The driving assistance control unit 200 may reduce a control intervention threshold for (b) the lane departure prevention control, which is control mainly resulting from a behavior of the own vehicle. In other words, the driving assistance control unit 200 may change the threshold in a direction in which the lane departure prevention control intervenes earlier.

Thereafter, the series of processes may be ended, or a return may be made.

[Step S320: Information Presentation Control Focused on Traveling Course Information]

The driving assistance control unit 200 may reduce an output frequency of the information regarding (a), (b), (d), and (e), out of the information regarding (a) to (e) described in above-described step S310, as compared with in normal control, and focus on displaying the information regarding (c). In other words, the driving assistance control unit 200 may focus on the traveling course information.

Thereafter, the flow may proceed to step S321.

[Step S321: Traveling Assistance Control Including Reducing Control Intervention Threshold Related to Surrounding Environment]

The driving assistance control unit 200 may reduce an intervention threshold for (a) the autonomous emergency braking control, which is control mainly resulting from a change in the environment around the own vehicle, i.e., environment-adaptive driving assistance control, out of control operations regarding (a) and (b) described in above-described step S311. In other words, the driving assistance control unit 200 may change the threshold in a direction in which the autonomous emergency braking control intervenes earlier.

Thereafter, the series of processes may be ended.

[Step S330: Information Presentation Control Focused on Route Environment Information]

The driving assistance control unit 200 may reduce an output frequency of the information regarding (a) to (c), out of the information regarding (a) to (e) described in above-described step S310, as compared with in normal control, and focus on outputting (e) the route environment information, i.e., output (e) the route environment information at a higher frequency, as compared with in normal control. In other words, the driving assistance control unit 200 may focus on the route environment information. The route environment information may typically indicate a remote situation 1 km or more ahead the vehicle.

In addition, (d) the rush-out information may be outputted in a manner similar to that in normal control.

In this case, traveling assistance control may be performed in a manner similar to that in normal control.

Thereafter, the series of processes may be ended.

According to the example embodiments described above, it is possible to achieve the following effects.

(1) The reference value of the parameter to be used for emotion determination regarding the occupant P is initialized at every driving cycle. Thus, even if there is a difference among individual occupants P or the physical condition of the occupant P changes from day to day, it is possible to appropriately determine the emotional state. The driving cycle may typically be a period including, as one cycle of the vehicle, from turning on of the main power to turning off of the main power through a series of stages of traveling.

(2) The reference value of the parameter may be updated multiple times during the same driving cycle. This makes it possible to perform driving assistance control appropriately reflecting a change in the emotion of the occupant P that changes every moment during driving of the vehicle 1.

(3) Threshold reduction may be performed after the anxious and confused state and the impatient and angry state are determined, and when these emotional states are determined again, output of a forced stop warning that prompts the occupant P to stop the vehicle and forced stop control of automatically stopping the vehicle may be performed. This makes it possible to prevent, beforehand, driving of the vehicle 1 from being continued in an emotional state significantly unsuitable for driving and resulting in a state involving a risk.

(4) After the forced stop warning and the forced stop control are performed, the forced stop warning and the forced stop control may be canceled when it is determined that the occupant has taken a rest for a predetermined period or more, to permit traveling of the vehicle after the emotional state is improved. This makes it possible to ensure convenience of the vehicle.

(5) When the impatient and angry state of the occupant P is determined, the intervention frequency of information presentation control may be reduced as compared with when the impatient and angry state is not determined. This makes it possible to suppress deterioration of the impatient and angry state resulting from information being frequently presented to the occupant in the impatient and angry state and the occupant P feeling inconvenience.

Even in this case, the route environment information acceptable to the occupant P and useful for the occupant P may be presented. This makes it possible to perform appropriate driving assistance while suppressing deterioration of the emotional state of the occupant P.

As described above, according to one or more embodiments of the disclosure, it is possible to provide a driving assistance control apparatus that makes it possible to perform driving assistance control appropriately reflecting an emotional state of an occupant.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the driving assistance apparatus and the vehicle to which the driving assistance apparatus is mountable are not limited to those in the example embodiments described above, and may be changed as appropriate.

For example, the operation of each unit, the kind of the sensor provided, and the event to be sensed are not particularly limited, and may be changed as appropriate.

(2) Specific control operations included in the driving assistance control are not limited to those in the example embodiments, and another operation may be added. Some operations in the example embodiments may be omitted.

(3) The parameter and determination logic to be used for determination of the emotional state of the occupant are not limited to those in the configuration in the example embodiments, and may be changed as appropriate.

For example, in the example embodiments, the anxious and confused state and the impatient and angry state may be determined based on the gap between the thumb of the occupant and the rim of the steering wheel. However, the finger to be used as a reference for measurement of the gap is not limited to the thumb, and may be another finger. A gap between a palm and the rim may be used instead.

In another example, instead of using such a gap, a contact pressure sensor may be provided on the rim of the steering wheel, and a degree of gripping of the steering wheel by the occupant may be estimated based on gripping force of the fingers and the palm of the occupant, i.e., a contact pressure applied by the fingers and the palm.

(4) In the example embodiments, acceleration or deceleration of the vehicle for determination of the impatient and angry state may be detected using the acceleration sensor. However, acceleration or deceleration of the vehicle may be detected or estimated by a method other than this method.

For example, a parameter such as brake operation force, an amount of the brake operation, a fluid pressure of a hydraulic brake, torque absorbed by a regenerative brake, or an amount of decrease or a rate of decrease in the vehicle speed may be used instead of the deceleration rate.

In another example, a parameter such as an amount of the accelerator operation or the target torque or the estimated actual torque of the traveling power source may be used instead of the acceleration rate.

As used herein, the term "collision" may be used interchangeably with the term "contact".

Each of the driving assistance control unit 200 and the occupant state determination unit 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the driving assistance control unit 200 and the occupant state determination unit 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the driving assistance control unit 200 and the occupant state determination unit 400 illustrated in FIG. 1.

The invention claimed is:

1. A driving assistance apparatus to be applied to a vehicle, the driving assistance apparatus comprising:
a traveling state detector configured to detect a traveling state of the vehicle;

an emotion determination processor configured to determine an emotion of an occupant of the vehicle; and a driving assistance processor configured to perform driving assistance control comprising one or both of information presentation to the occupant and traveling assistance control on the vehicle, in accordance with one or both of an output of the traveling state detector regarding the traveling state and an output of the emotion determination processor regarding the emotion of the occupant, wherein the emotion determination processor is configured to determine, as the emotion of the occupant, a driving unsuitable emotion by comparing, with a predetermined threshold, a difference between a reference value and a current value of a parameter indicating a physical state of the occupant, and to update the reference value at each driving cycle, wherein the emotion determination processor is configured to determine an impatient and angry state of the occupant, and wherein, when the emotion determination processor determines the impatient and angry state, the driving assistance processor is configured to suppress an intervention frequency of at least one or more control operations comprised in the driving assistance control, as compared with when the emotion determination processor does not determine the impatient and angry state.

2. The driving assistance apparatus according to claim 1, wherein the emotion determination processor is configured to update the reference value multiple times during each driving cycle.

3. The driving assistance apparatus according to claim 1, wherein the emotion determination processor is configured to, upon determining the driving unsuitable emotion, determine a level of the driving unsuitable emotion, and the driving assistance processor is configured to perform, when the level of the driving unsuitable emotion has deteriorated by a predetermined amount or more, one or both of presentation of information to prompt the occupant to stop the vehicle and forced stop control of automatically stopping the vehicle.

4. The driving assistance apparatus according to claim 2, wherein the emotion determination processor is configured to, upon determining the driving unsuitable emotion, determine a level of the driving unsuitable emotion, and the driving assistance processor is configured to perform, when the level of the driving unsuitable emotion has deteriorated by a predetermined amount or more, one or both of presentation of information to prompt the occupant to stop the vehicle and forced stop control of automatically stopping the vehicle.

5. The driving assistance apparatus according to claim 3, wherein the driving assistance processor is configured to, upon determining that the occupant has taken a rest for a predetermined period or more, cancel one or both of the presentation of the information to prompt the occupant to stop the vehicle and the forced stop control.

6. The driving assistance apparatus according to claim 4, wherein the driving assistance processor is configured to, upon determining that the occupant has taken a rest for a predetermined period or more, cancel one or both of the presentation of the information to prompt the occupant to stop the vehicle and the forced stop control.

7. A driving assistance apparatus to be applied to a vehicle, the driving assistance apparatus comprising circuitry configured to detect a traveling state of the vehicle, determine an emotion of an occupant of the vehicle, and perform driving assistance control comprising one or both of information presentation to the occupant and traveling assistance control on the vehicle, in accordance with one or both of the traveling state and the emotion of the occupant, wherein the circuitry is configured to determine, as the emotion of the occupant, a driving unsuitable emotion by comparing, with a predetermined threshold, a difference between a reference value and a current value of a parameter indicating a physical state of the occupant, and to update the reference value at each driving cycle, wherein the circuitry is further configured to determine an impatient and angry state of the occupant, and wherein, when the impatient and angry state are determined, the circuitry is configured to suppress an intervention frequency of at least one or more control operations comprised in the driving assistance control, as compared with when the impatient and angry state are not determined.

* * * * *